United States Patent
Jung

(10) Patent No.: US 10,470,227 B2
(45) Date of Patent: Nov. 5, 2019

(54) CONNECTION CONTROL METHOD AND SYSTEM FOR VEHICLE CONTROL PROGRAM OF VEHICLE

(71) Applicants: Hyundai Motor Company, Seoul (KR); Kia Motors Corporation, Seoul (KR)

(72) Inventor: Sang Yong Jung, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/661,979

(22) Filed: Jul. 27, 2017

(65) Prior Publication Data

US 2018/0124845 A1    May 3, 2018

(30) Foreign Application Priority Data

Oct. 31, 2016   (KR) .......................... 10-2016-0143497

(51) Int. Cl.
*H04B 7/00*     (2006.01)
*H04W 76/14*    (2018.01)
*H04W 4/80*     (2018.01)

(52) U.S. Cl.
CPC ............. *H04W 76/14* (2018.02); *H04W 4/80* (2018.02)

(58) Field of Classification Search
CPC ......... G06C 21/04; G06C 23/02; H04W 4/80; H04W 76/14; H04W 84/18
See application file for complete search history.

(56) References Cited

U.S. PATENT DOCUMENTS

| | | | |
|---|---|---|---|
| 8,768,539 B1 | 7/2014 | Clement et al. | |
| 2013/0103200 A1* | 4/2013 | Tucker | H04W 76/14 |
| 2014/0369483 A1* | 12/2014 | Lovitt | H04M 3/56 |
| | | | 379/202.01 |
| 2015/0271858 A1* | 9/2015 | Chu | H04B 5/0031 |
| | | | 455/41.2 |
| 2018/0146081 A1* | 5/2018 | Brenner | H04W 76/14 |

FOREIGN PATENT DOCUMENTS

| | | |
|---|---|---|
| KR | 10-2008-0099586 A | 11/2008 |
| KR | 10-2015-0080191 A | 7/2015 |
| KR | 10-2016-0106995 A | 9/2016 |

* cited by examiner

*Primary Examiner* — Xin Jia
(74) *Attorney, Agent, or Firm* — Morgan, Lewis & Bockius LLP

(57) ABSTRACT

Disclosed herein are a connection control method for a vehicle control program of a vehicle and a head unit system configured for conveniently using the vehicle control program and Bluetooth communications without again performing Bluetooth pairing when a user performs starting off and then starting on during the use of the vehicle control program.

6 Claims, 2 Drawing Sheets

CONNECTION CONTROL METHOD AND SYSTEM FOR VEHICLE CONTROL PROGRAM OF VEHICLE

CROSS-REFERENCE(S) TO RELATED APPLICATIONS

The present application claims priority to Korean Patent Application No. 10-2016-0143497, filed on Oct. 31, 2016, the entire contents of which is incorporated herein for all purposes by this reference.

BACKGROUND OF THE INVENTION

Field of the Invention

The present invention relates to a connection control method and system for a vehicle control program of a vehicle, and more particularly, to a connection control method for a vehicle control program of a vehicle and a head device system capable of conveniently using the vehicle control program and Bluetooth communication without performing Bluetooth pairing again when a user performs the starting off a vehicle and then the starting on during the use of the vehicle control program.

Description of Related Art

In recent years, a function of controlling a vehicle with user equipment by connecting the user equipment to a head device of the vehicle using a vehicle control program has been provided. The applications of the connectivity function have been recently extended for each car maker.

As representative vehicle control programs, there are 'Android Auto' of Google Co. and 'Carplay' of Apple Co. Among those, the Android Auto performs vehicle-user equipment data communication by wire through a USB connection and wirelessly performs a call function by Bluetooth communication. Therefore, to perform and use the Android Auto, the vehicle and the user equipment need to be connected to each other by wire and the wireless communication.

Among the vehicle control programs, conventionally, Android Auto has the difference in conditions of releasing the Bluetooth connection and the USB connection when the user performs the starting off in the state in which the USB connection and the Bluetooth connection are normally made after the user performs the starting on. That is, the Bluetooth connection is released after the starting off and the USB connection is released at the time of a shut down of the head device.

When the USB connection is kept even after the user performs the starting off under the release condition before the shut down of the head device, the USB connection is kept but the Bluetooth connection is released.

At the present point, the user equipment continuously tries pairing to the head device to perform the Bluetooth connection. When the head device is shut down, no Bluetooth reaction to the user equipment is present in the head device, and therefore the user equipment deletes head device information from a pairing list.

When the user performs restarting, the USB connection is made and thus there is no need to reset the USB, but the Bluetooth has a problem in that the user needs to reset the Bluetooth due to the deletion of the head device formation from the pairing list.

As a result, there is a problem in that it is troublesome and inconvenient to reset the Bluetooth, and the unnecessary time required to reset the Bluetooth is increased.

Therefore, a solution that can use the vehicle control program without resetting the Bluetooth at the time of restarting after the starting off during the use of the vehicle control program is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a connection control method for a vehicle control program of a vehicle and a head device system configured for conveniently using the vehicle control program and Bluetooth communications without performing Bluetooth pairing again when a user performs starting off and then starting on during use of the vehicle control program.

Various aspects of the present invention are directed to providing a connection control method for a vehicle control program of a vehicle, including starting off the vehicle; determining whether user equipment and a head device of the vehicle are connected by the vehicle control program and Bluetooth communication at the time of the starting off of the vehicle; keeping a Bluetooth connection between the head device and the user equipment even when the starting of the vehicle is turned off, when the user equipment and the head device of the vehicle are connected by the vehicle control program; recognizing whether the head device is shut down after the starting of the vehicle is turned off; and releasing the Bluetooth connection between the head device and the user equipment at the time of the shut down of the head device.

In the determining whether the user equipment and the head device of the vehicle are connected, the user equipment and the head device may be connected by wire and wirelessly by the Bluetooth communication and USB, and when the user equipment is executing the vehicle control program it may be determined that the vehicle control program is connected between the user equipment and the head device.

The connection control method may further include releasing a Bluetooth connection between the user equipment and the head device when the user equipment is not connected to the head device of the vehicle at the time of the starting off of the vehicle.

In the keeping of the Bluetooth connection between the head device and the user equipment, the Bluetooth communication and the USB connection between the head device and the user equipment may be kept.

The connection control method may further include: after the keeping of the Bluetooth connection between the head device and the user equipment, shutting down the head device after a predetermined time elapses.

Accordingly, various aspects of the present invention are directed to providing a connection control system for a vehicle control program of a vehicle including a Bluetooth module configured to be disposed in the vehicle and connected to the user equipment by wireless communication; a USB module configured to be disposed in the vehicle and connected to the user equipment by wired communication; and a controller configured to be disposed in the vehicle, keep a Bluetooth connection between the head device and the user equipment even when the starting of the vehicle is turned off, when the user equipment and the head device of the vehicle are connected by the vehicle control program and Bluetooth communication at the time of starting off of the vehicle, and release a Bluetooth connection between the head device and the user equipment when the head device is shut down.

The controller may keep a connection between the user equipment and the head device by wire and wirelessly through the Bluetooth communication and USB when it is determined whether the vehicle control program is connected between the user equipment and the head device, and may determine that the vehicle control program is connected when the user equipment is executing the vehicle control program.

The controller may shut down the head device after a predetermined time elapses from starting off of the vehicle.

The methods and apparatuses of the present invention have other features and advantages which will be apparent from or are set forth in more detail in the accompanying drawings, which are incorporated herein, and the following Detailed Description, which together server to explain certain principles of the present invention.

Figure 1:
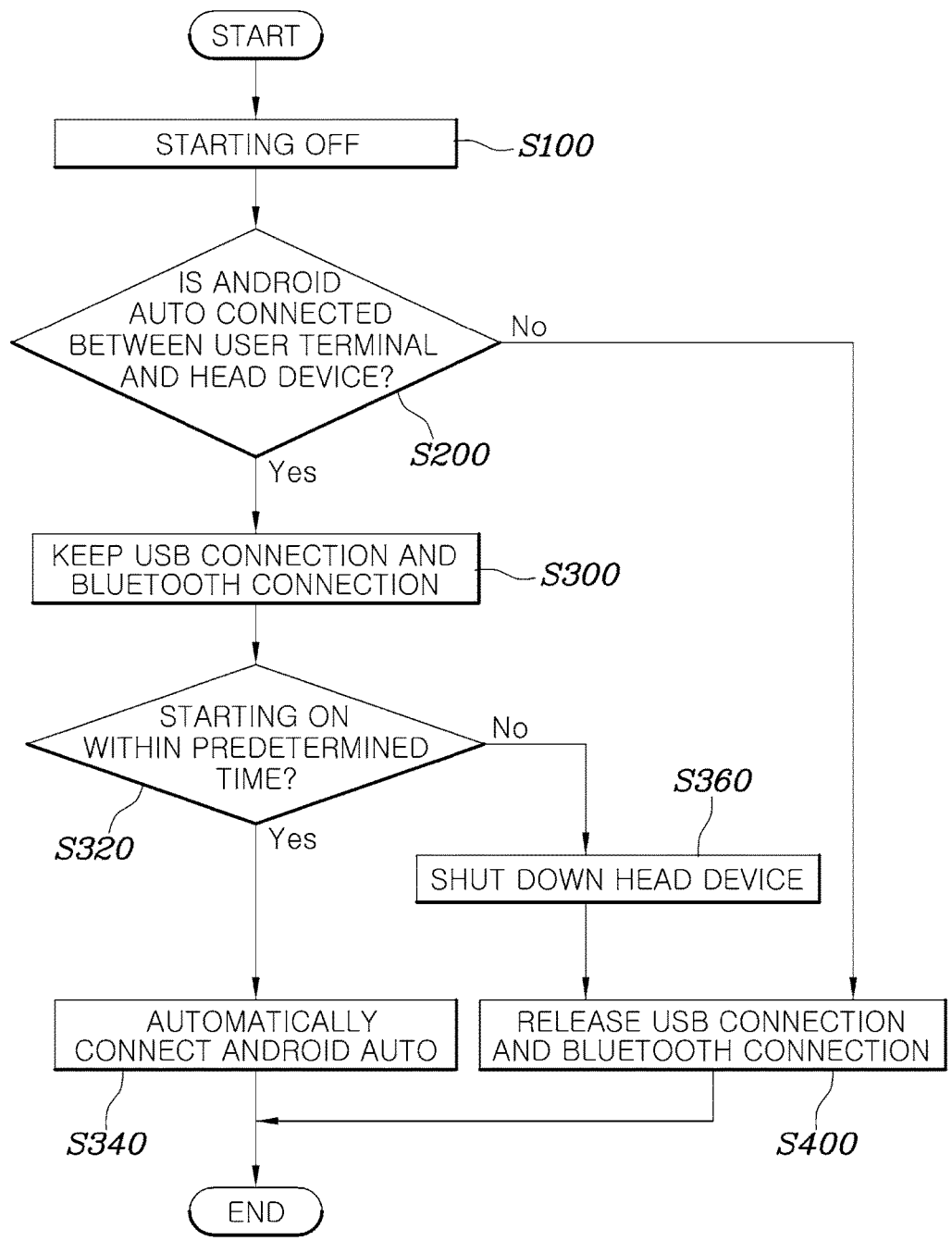
FIG. 1 is a flow chart of a connection control method for a vehicle control program of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a connection control method and system for a vehicle control program of a vehicle according to various exemplary embodiments of the present invention will be described with reference to the accompanying drawings.

Figure 2:
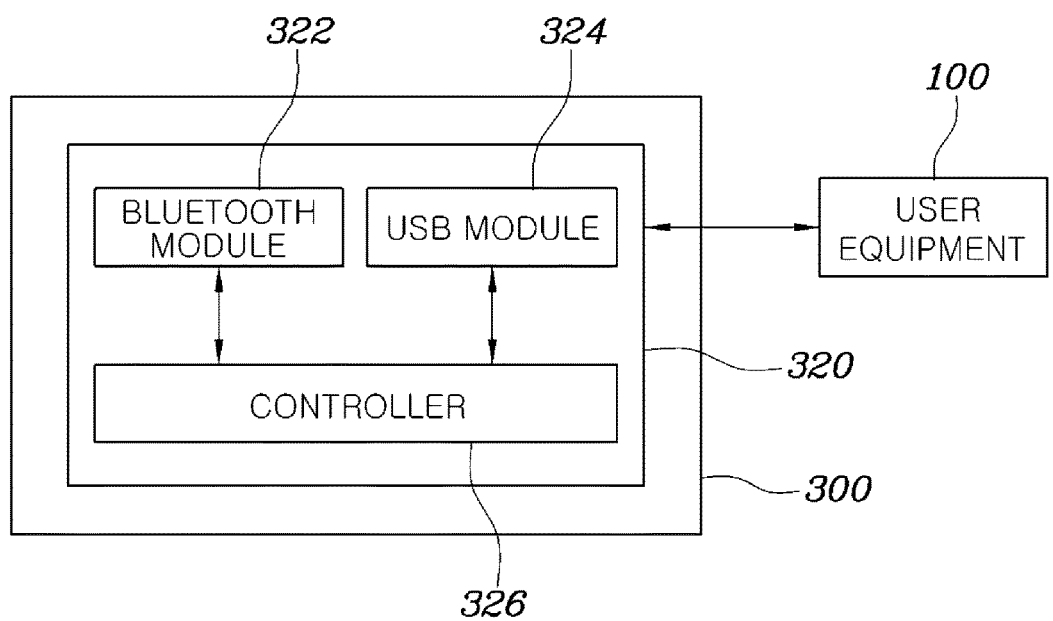
FIG. 2 is a configuration diagram of a connection control system for a vehicle control program of a vehicle according to an exemplary embodiment of the present invention.

FIG. 1 is a flow chart of a connection control method for a vehicle control program of a vehicle according to an exemplary embodiment of the present invention. FIG. 2 is a configuration diagram of a connection control system for a vehicle control program of a vehicle according to an exemplary embodiment of the present invention.

Referring first to FIG. 1, the connection control method for a vehicle control program of a vehicle according to the exemplary embodiment of the present invention may include starting off a vehicle (S100); determining whether user equipment and a head device of the vehicle are connected by the vehicle control program and Bluetooth communication at the time of the starting off of the vehicle (S200); keeping a Bluetooth connection between the head device and the user equipment even when the starting of the vehicle is turned off, when the user equipment and the head device of the vehicle are connected by the vehicle control program (S300); recognizing whether the head device is shut down after the starting of the vehicle is turned off (S360); and releasing the Bluetooth connection between the head device and the user equipment at the time of the shut down of the head device (S400).

In the starting off of the vehicle (S100), a user turns off the starting of the vehicle in the state in which the vehicle control program of the vehicle is connected between the user equipment and the head device after the user performs the starting on.

Here, for the vehicle control program, there are 'Android Auto' of Google Co. and 'Carplay' of Apple Co. In the exemplary embodiment of the present invention, the Android Auto may be used as the vehicle control program.

In determining whether user equipment and the head device of the vehicle are connected by the vehicle control program and the Bluetooth communication at the time of the starting off of the vehicle, the user equipment and the head device continues to be connected by wire and wirelessly by the Bluetooth communication and USB and when the user equipment is executing the vehicle control program, it is determined that the vehicle control program is connected between the user equipment and the head device. That is, when the USB connection between the user equipment and the head device is made by wire and the Bluetooth connection therebetween is made wirelessly, the user equipment and the head device keep on being connected to the vehicle control program.

The connection control method enters the keeping of the USB connection and the Bluetooth connection when the vehicle control program is connected between the user equipment and the head device. At the present point, the USB connection and the Bluetooth connection are kept before the head device is shut down.

On the other hand, the connection control method enters the releasing of the USB connection and the Bluetooth connection when the vehicle control program is not connected between the user equipment and the head device (S400). The reason for releasing the USB connection and the Bluetooth connection when the vehicle control program is not connected between the user equipment and the head device is that even when the USB connection is made after the starting off, there is no need to try pairing for the head device in the user equipment and delete a pairing list from the user equipment. Therefore, the existing Bluetooth setting is present even at the time of restarting.

When it is determined that the vehicle control program is connected between the user equipment and the head device after the starting off, the connection control method enters the keeping of the Bluetooth connection between the head device and the user equipment (S300). In the step (S300) the Bluetooth communication and the USB connection between the head device and the user equipment are kept for a predetermined time.

Here, the predetermined time does not mean time required to start the vehicle after the starting of the vehicle is turned off and the user parks the vehicle, but means a general time required to restart the vehicle after the starting off, in which the predetermined time may be approximately 3 minutes. Here, the 3 minutes correspond to time taken to determine whether the user parks the vehicle or simply restarts the vehicle, after the user performs the starting off.

When it is determined that the starting of the vehicle is turned off (S100) and the vehicle control program continues to be connected between the user equipment and the head device (S200), the USB connection and the Bluetooth communication are kept (S300) and the connection control method proceeds in determining whether the restarting by the user is within a predetermined time (S320). At the present point, when restarting by the user is performed within the predetermined time, the USB connection and the Bluetooth connection are kept, and therefore the vehicle control program is automatically connected between the user equipment and the head device without being separately set. By doing so, unlike the related art, the user need not set the Bluetooth at the time of the restarting after the user performs the starting off. Therefore, the user may eliminate the trouble due to the resetting of the Bluetooth and prevent the unnecessary time waste.

Meanwhile, after the restarting by the user passes the predetermined time, the user recognizes whether the head device is shut down (S360). When the predetermined time lapses, the head device is shut down and the USB connection and the Bluetooth connection are released at the time of the shutdown of the head device (S400).

FIG. 2 is a configuration diagram of a connection control system for a vehicle control program of a vehicle according to an exemplary embodiment of the present invention. As illustrated in FIG. 2, the connection control system for a vehicle control program of a vehicle according to an exemplary embodiment of the present invention may be configured to include a Bluetooth module 322, a USB module 324, and a controller 326.

According to an exemplary embodiment of the present invention, the Bluetooth module 322 is disposed in a vehicle 300 and is connected to the user equipment 100 by wireless communication. That is, a call is performed by the Bluetooth connection between the user equipment 100 and the head device 320.

According to an exemplary embodiment of the present invention, the USB module 324 is disposed in the vehicle 300 and is connected to the user equipment 100 by wired communication. Data communication is performed by the USB connection between the user equipment 100 and the head device 320.

According to an exemplary embodiment of the present invention, the controller 326 is disposed in the vehicle 300, and keeps the Bluetooth connection between the head device 320 and the user equipment 100, even when the starting of the vehicle is turned off, when the user equipment 100 and the head device 320 of the vehicle 300 are connected by the vehicle control program and the Bluetooth communication at the time of the starting off of the vehicle and releases the Bluetooth connection between the head device 320 and the user equipment 100 when the head device 320 is shut down.

The controller 326 determines that when it is determined that the vehicle control program is connected between the user equipment 100 and the head device 320, the user equipment 100 and the head device 320 are connected wirelessly and by wire by the Bluetooth communication and the USB connection and determines that when the user equipment 100 is executing the vehicle control program, the vehicle control program is connected between the user equipment 100 and the head device 320.

According to an exemplary embodiment of the present invention, when the vehicle control program is the Android Auto, it is determined whether the vehicle control program is connected between the user equipment and the head device based on the data communication with the USB and based on whether to support Android Auto projection.

Android Auto projection support means that the user device connected to the head device checks whether it has the Android Auto projection function.

The controller 326 shuts down the head device after the predetermined time elapses from the starting off of the vehicle. Here, the predetermine time does not mean the time required to start the vehicle after the starting of the vehicle is turned off and the user parks the vehicle but means a general time required to restart the vehicle after the starting off, in which the predetermined time may be approximately 3 minutes. Here, the 3 minutes correspond to time taken to determine whether the user parks the vehicle or simply restarts the vehicle, after the user performs the starting off.

As described above, according to the connection control method and system for a vehicle control program of a vehicle of the present invention, it is possible to conveniently use the vehicle control program and Bluetooth communications without performing the Bluetooth pairing again when the user performs starting off and then starting on during the use of the vehicle control program.

Further, according to the connection control method and system for a vehicle control program of a vehicle of several exemplary embodiments of the present invention, it is possible for the user equipment to remove the trouble of again searching the head device information in the pairing list and then resetting the Bluetooth, due to the deletion of the head device information from the pairing list.

In addition, according to the connection control method and system for a vehicle control program of a vehicle of several exemplary embodiments of the present invention, it is possible to reduce the unnecessary time required during the Bluetooth pairing.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A connection control method for a vehicle control program of a vehicle, the connection control method comprising:

starting off of the vehicle;
determining whether a user equipment and a head device of the vehicle are connected by the vehicle control program and Bluetooth communication at a time of the starting off of the vehicle;
keeping continuously a Bluetooth connection between the head device and the user equipment after the starting of the vehicle is turned off, when the user equipment and the head device of the vehicle are connected by the vehicle control program;
recognizing whether the head device is shut down after the starting of the vehicle is turned off; and
releasing the Bluetooth connection between the head device and the user equipment at a time of the shut down of the head device,
wherein in the determining whether the user equipment and the head device of the vehicle are connected, when the connection between the user equipment and the head device by wire and wirelessly by the Bluetooth communication and USB is kept and the user equipment is executing the vehicle control program, a controller of the head device is configured to determine that the vehicle control program is connected between the user equipment and the head device.

2. The connection control method of claim 1, further comprising:
releasing the Bluetooth connection between the user equipment and the head device when the user equipment is not connected to the head device of the vehicle at a time of the starting off of the vehicle.

3. The connection control method of claim 1, wherein in the keeping of the Bluetooth connection between the head device and the user equipment, the Bluetooth communication and the USB connection between the head device and the user equipment are kept.

4. The connection control method of claim 1, further comprising:
after the keeping of the Bluetooth connection between the head device and the user equipment, shutting down the head device after a predetermined time elapses.

5. A connection control system for a vehicle control program of a vehicle, the connection control system comprising:
a Bluetooth module configured to be equipped in the vehicle and connected to a user equipment by wireless communication;
a USB module configured to be equipped in the vehicle and connected to the user equipment by wired communication; and
a controller configured to be equipped in the vehicle, keep continuously a Bluetooth connection between a head device and the user equipment, after the starting of the vehicle is turned off, when the user equipment and the head device of the vehicle are connected by the vehicle control program and Bluetooth communication at a time of starting off of the vehicle and release the Bluetooth connection between the head device and the user equipment, when the head device is shut down,
wherein the controller is configured to determine that the vehicle control program is connected when the connection between the user equipment and the head device by wire and wirelessly by the Bluetooth communication and USB is kept and the user equipment is executing the vehicle control program.

6. The connection control system of claim 5, wherein the controller shuts down the head device after a predetermined time elapses from starting off of the vehicle.

* * * * *